United States Patent
Wang

(10) Patent No.: US 9,894,057 B2
(45) Date of Patent: Feb. 13, 2018

(54) METHOD AND SYSTEM FOR MANAGING SECURE CUSTOM DOMAINS

(71) Applicant: Lantirn Incorporated, Mountain View, CA (US)

(72) Inventor: Lu Wang, Mountain View, CA (US)

(73) Assignee: Lantirn Inc., Mountain View, CA (US)

( * ) Notice: Subject to any disclaimer, the term of this patent is extended or adjusted under 35 U.S.C. 154(b) by 0 days.

(21) Appl. No.: 15/588,123

(22) Filed: May 5, 2017

(65) Prior Publication Data

US 2017/0250978 A1    Aug. 31, 2017

(51) Int. Cl.
*H04L 12/26* (2006.01)
*H04L 29/06* (2006.01)
*G06F 21/44* (2013.01)

(52) U.S. Cl.
CPC .......... *H04L 63/0823* (2013.01); *G06F 21/44* (2013.01); *H04L 63/0428* (2013.01)

(58) Field of Classification Search
CPC .............................. G06F 21/44; H04L 63/0823
See application file for complete search history.

(56) References Cited

U.S. PATENT DOCUMENTS

| | | | | |
|---|---|---|---|---|
| 2005/0289084 A1* | 12/2005 | Thayer | ............... | G06Q 20/3674 705/67 |
| 2014/0365372 A1* | 12/2014 | Ross | ................... | H04L 63/0471 705/44 |
| 2015/0229481 A1* | 8/2015 | Prince | ................. | H04L 63/0823 713/175 |
| 2017/0111352 A1* | 4/2017 | Schmaholz | ......... | H04L 63/0823 |

* cited by examiner

*Primary Examiner* — David J Pearson
(74) *Attorney, Agent, or Firm* — Joe Zheng

(57) ABSTRACT

Method, system and infrastructures for managing certificates for platform providers are described. A platform provider provides a platform to host a plurality of virtual sites designated individually with custom specified hostnames. According to one aspect of the present invention, traffic originating from a web browser to a designated website with a hostname is directed to a server (herein "control server") designed for serving a corresponding certificate to establish a secure session between the browser and the designated website being hosted on a server (herein "platform server") operated by a platform provider. In operation, the corresponding certificate may be retrieved from a cache in or accessible by the control server, or the control server is caused to generate a certificate based on the access request from the browser after a verification process.

19 Claims, 12 Drawing Sheets

FIG. 2C

```
$ORIGIN siteX.com.
$TTL 1h                                              ; designates the start of this zone file in the namespace
siteX.com.    IN  SOA    ns.siteX.com. username.siteX.com. ( 2007120710 1d 2h 4w 1h )
siteX.com.    IN  NS     ns                          ; ns.siteX.com is a nameserver for siteX.com
siteX.com.    IN  NS     ns.somewhere.siteX.         ; ns.somewhere.siteX is a backup nameserver for siteX.com
siteX.com.    IN  MX     10 mail.siteX.com.          ; mail.siteX.com is the mailserver for siteX.com
@             IN  MX     20 mail2.siteX.com.         ; equivalent to above line, "@" represents zone origin
@             IN  MX     50 mail3                    ; equivalent to above line, but using a relative host name
              IN  AAAA   2001:db8:10::1              ; IPv6 address for siteX.com
ns            IN  A      192.0.2.2                   ; IPv4 address for ns.siteX.com
              IN  AAAA   2001:db8:10::2              ; IPv6 address for ns.siteX.com
www           IN  CNAME  ABC.ClearAlias.com.         ; redirects traffic to ClearAlias.com
wwwtest       IN  CNAME  www                         ; wwwtest.siteX.com is another alias for www.siteX.com
mail          IN  A      192.0.2.3                   ; IPv4 address for mail.siteX.com
mail2         IN  A      192.0.2.4                   ; IPv4 address for mail2.siteX.com
mail3         IN  A      192.0.2.5                   ; IPv4 address for mail3.siteX.com
```

250

```
$ORIGIN siteX.com.
$TTL 1h
siteX.com.    IN SOA    ns.siteX.com. username.siteX.com. ( 2007120710 1d 2h 4w 1h )
siteX.com.    IN NS     ns                        ; ns.siteX.com is a nameserver for siteX.com
siteX.com.    IN NS     ns.somewhere.siteX.       ; ns.somewhere.siteX is a backup nameserver for siteX.com
siteX.com.    IN MX     10 mail.siteX.com.        ; mail.siteX.com is the mailserver for siteX.com
@             IN MX     20 mail2.siteX.com.       ; equivalent to above line, "@" represents zone origin
@             IN MX     50 mail3                  ; equivalent to above line, but using a relative host name
              IN AAAA   2001:db8:10::1            ; IPv6 address for siteX.com
ns            IN A      192.0.2.2                 ; IPv4 address for ns.siteX.com
              IN AAAA   2001:db8:10::2            ; IPv6 address for ns.siteX.com
www           IN CNAME  F2A3.G3B4.ABC.ClearAlias.com.
                                                  ; redirects traffic to ClearAlias.com.
wwwtest       IN CNAME  www                       ; wwwtest.siteX.com is another alias for www.siteX.com
mail          IN A      192.0.2.3                 ; IPv4 address for mail.siteX.com
mail2         IN A      192.0.2.4                 ; IPv4 address for mail2.siteX.com
mail3         IN A      192.0.2.5                 ; IPv4 address for mail3.siteX.com
```

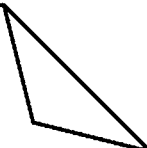

FIG. 2D

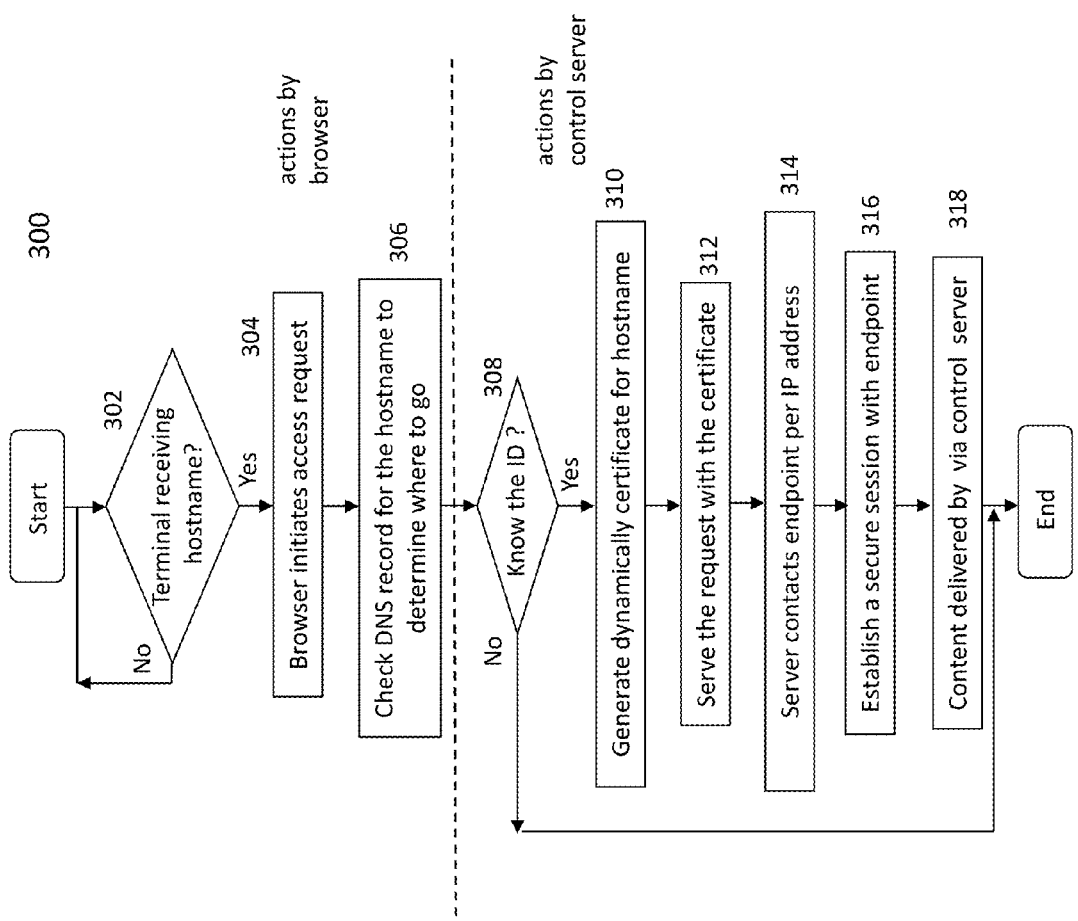

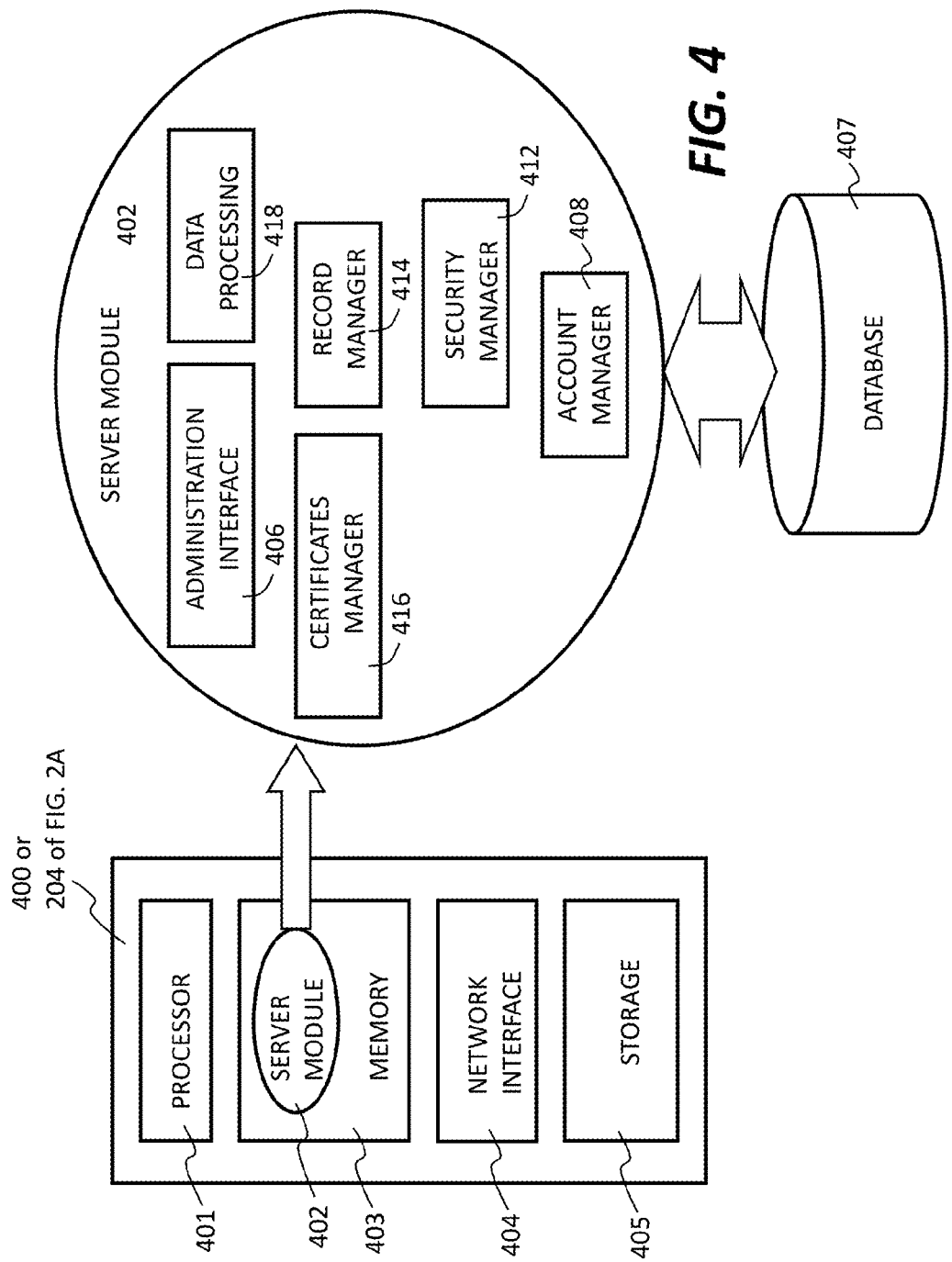

METHOD AND SYSTEM FOR MANAGING SECURE CUSTOM DOMAINS

BACKGROUND OF THE INVENTION

Field of the Invention

The present invention is related to the area of computer-facilitated communications over networks, and more particularly related to a method, a system and infrastructure for managing and serving certificates for service or platform providers to provide secured communications over a data network (e.g., the Internet).

Description of the Related Art

SSL (Secure Sockets Layer) is a standard security technology for establishing an encrypted link between a web server and a browser (e.g., IE from Microsoft or Chrome from Google). This link ensures that all data passed between the web server and browsers remain private and integral. SSL is an industry standard and is used by millions of websites to protect their online transactions with their customers.

To create such an SSL connection, a web server requires an SSL certificate. When an entity chooses to activate SSL on its web server, the entity or an operator thereof has to complete a number of questions about the website and the entity. With a valid SSL certificate, the web server will then be able to establish an encrypted link between the website and a web browser accessing the website.

Such an encrypted link is initiated, established and maintained by HTTPS (HTTP over SSL) which is a protocol for secure communications over a computer network. HTTPS widely used on the Internet consists of communication over Hypertext Transfer Protocol (HTTP) within a connection encrypted by Transport Layer Security, or its predecessor SSL. The main motivation for HTTPS is authentication of the visited website and protection of the privacy and integrity of the exchanged data. In its popular deployment on the internet, HTTPS provides authentication of the website and associated web server with which one is communicating and further protects against man-in-the-middle attacks. Additionally, it provides bidirectional encryption of communications between a client and a server, which protects against eavesdropping and tampering with or forging the contents of the communication. In practice, this provides a reasonable guarantee that one is communicating with precisely the website that one intended to communicate with (as opposed to an impostor), as well as ensuring that the contents of communications between the user and site cannot be read or forged by any third party.

Traditionally, each IP address serves one SSL certificate. This would be a problem when one IP address serves many virtual sites, such as in the case for a multi-tenant SaaS or hosting provider, each user or tenant designating a different domain name thus requiring a different certificate. As an example, FIG. 1A shows a display 100 of a browser accessing an exemplary online store or website, www.shopemmajoy.com. As shown by the notation 102, it is a secured website indicated by https://. In other words, communication between the browser and the website is secured. In addition, a user (i.e., a customer) operating the browser is ensured that he/she is accessing an authenticated website operated by shopemmajoy, all of which is guaranteed by the underlying SSL certificate from the server.

It is assumed that the customer shopping on the website proceeds with checking out some chosen items. FIG. 1B shows a display 110 of the browser accessing another website (https://checkout.shopify.com . . . ). The sudden change of the website, especially at the moment of conducting a financial transaction, could potentially cause the customer to pause the transaction, if the customer is savvy enough to understand the consequence of going to another website to pay for something chosen at a different website, shopify.com.

In reality, there is nothing wrong with the redirection of the shopping website to a checkout page at another website. The operator of the checkout website, Shopify in this case, is a service provider in the business of facilitating retail point-of-sale transactions for online stores. Many online stores sign up with Shopify to let the service provider take care of various transactions. In other words, Shopify would need to manage at least one certificate for each of its customers. As more businesses sign up with Shopify, the cost and complexity of managing a growing number of certificates are going up.

From a business perspective, it may be operationally acceptable for a large corporation, such as Shopify, to manage certificates for millions of its customers. However, for a small business, it would be a forbidden operation to manage a large number of certificates for its hosted websites individually designated by many of its customers. Many multi-tenant applications or platform providers (a.k.a., platform or service provider) wish to provide their users with custom-designated domains that reside behind SSL (HTTPS). For example, a blog-base provider (e.g., www.exampleblog.com) wishes to allow each of its users to have their own designated hostnames (e.g., johnsmith.exampleblog.com or site4mary.blogmedium.com). As more users sign up with the provider, there are more certificates. The cost and complexity of managing these secured websites with at least one certificate for each of the users can easily go beyond what the provider could do operationally. Thus, there is a need for techniques that can help these providers, small or large, manage as many users as possible without incurring the cost and complexity of managing the certificates.

In operation, a platform provider traditionally needs to store at least a certificate and a certificate key in a database record associated with a domain name. When a request for accessing a hosted website comes in, the platform provider has to serve a corresponding certificate based on the matched domain name (e.g., a requested hostname). This becomes a problem when the platform provider needs to serve a large number of customers. Each certificate has a different expiration date. It would be a huge burden for a service provider, especially as a small to medium business, to manage renewals of a larger number of certificates. Allowing a certificate to lapse and expire could be a big issue for platform providers and their customers. Thus, there is another need for techniques that can help these providers manage as many users as possible without concerning the renewals of the certificates for their increasing customers.

For smaller platforms that want to serve dynamic customer domains with SSL, this can be costly to manage. Larger companies, such as Shopify, have the resources to provide their own IT infrastructure, but smaller platforms specialized in serving content specific to an application platform do not want to invest in infrastructure to deal with the handling of a large number of customer certificates. Thus, there is yet another need for techniques that can help these providers with necessary infrastructure to manage the certificates of their customers transparently.

There are more needs that will become apparent upon examining the following detailed description of the present invention.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In general, the present invention provides a method, a system and infrastructure for managing and serving certificates for a plurality of platform providers, each hosting a plurality of virtual sites designated individually with custom specified domain names or hostnames. According to one aspect of the present invention, traffic originating from an application (e.g., a web browser) to a designated website with a hostname is directed to a server (herein "control server") designed for serving a corresponding certificate to establish a secure session between the browser and the designated website being hosted on a server (herein "platform server") operated by a service or platform provider. In operation, the corresponding certificate may be retrieved from a cache in or accessible by the control server or the control server is caused to generate a certificate based on the access request from the browser after a verification process.

According to another aspect of the present invention, the traffic originating from the web browser is directed to the control server through a directory (e.g., DNS), where the directory includes or has been updated to include an identifier corresponding to the hostname. The identifier is known to the control server and can be used to identify a contracted platform provider or a domain name of a server operated by the platform provider.

According to still another aspect of the present invention, the control server is designed to determine an endpoint (e.g., an IP address or a domain name of the platform server) upon receiving the traffic from the browser, provided that the platform server being accessed is contracted for the services provided by the control server. A secure session is then established between the control server and the browser.

According to still another aspect of the present invention, the control server retrieves the IP address of the platform server through a database including relationships between the control server and the platform server hosting the website. The control server is then designed to access the platform server per the IP address and acknowledges a mismatch in a received certificate from the platform server in view of the hostname.

According to yet another aspect of the present invention, all requested content is delivered securely from the website to the browser via the control server without having the platform server hosting the website serve an SSL certificate associated with the hostname in the request.

The present invention may be implemented in software or in a combination of software and hardware, and practiced as a system, a process, a method or part of infrastructure. According to one embodiment, the present invention is a method for managing a secure session between a terminal and a platform server, the method comprises: receiving in a control server data traffic of a first access request initiated from an application running in the terminal, the first access request including a hostname of a virtual site, wherein the data traffic is directed to the control server per a directory on a network, and the virtual site is hosted on the platform server operated by a platform provider. The method further comprises determining an identifier in the directory; looking up for the platform server corresponding to the identifier; and serving a first certificate of the virtual site to the first access request to establish a secure session between the terminal and the control server, when the first certificate is cached locally in the control server. Alternatively when the first certificate is not cached locally in the control server, the method comprises: generating the first certificate based on the hostname when the first certificate is not cached locally in the control server; and serving the newly generated first certificate to the first access request to establish a secure session between the terminal and the control server.

According to another embodiment, the present invention is a control server for managing a secure session between a terminal and an endpoint, the control server comprising: a network interface to couple the control server to a data network; an interface to a storage device including a database having at least a relationship between an identifier and an endpoint related to a platform provider; a processor; and a memory space, coupled to the processor, for storing code. The code is executed by the processor to perform operations of: receiving data traffic of a first access request initiated from an application running in the terminal, the first access request including a hostname of a virtual site; determining an identifier in a directory; looking up for the endpoint corresponding to the identifier; and serving a first certificate to the first request to establish a secure session with the terminal, when the first certificate is cached locally. In the event that the first certificate is not cached locally, the control server is caused to perform operations of generating the first certificate based on the hostname; and serving the newly generated first certificate to the first access request to establish a secure session with the terminal.

According to another embodiment, the control server is caused to initiate a second access request in the control server; receive a second certificate from the platform server; extract a common name related to the platform server via the second certificate; and ignore a mismatch between the hostname and the common name of the platform server to establish a secure session between the control server and the endpoint or the platform server, wherein the second access request includes the hostname.

One of the objects, features, and advantages of the present invention is to provide techniques for supporting a plurality of platform providers to manage security certificates for their respective users subscribing various hosting services offered by the platform providers.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2C shows an example of a structured zone file that directs data traffic going to siteX.com to a control server with a domain name: ClearAlias.com and an identifier: ABC, coded as ABC.ClearAlias.com;

FIG. 2D shows another example of a structured zone file with a verifier, an identifier and a domain name to direct a traffic of going to siteX.com to ClearAlias.com;

FIG. 3A shows a flowchart or process of managing certificates for one or more platform or service providers according to one embodiment of the present invention;

FIG. 4 shows a functional block diagram of a control server, where a server module resides in a memory space and is executable by one or more processors to perform the functions of managing secure communications between its contracted platform providers and browsers accessing certain websites being hosted thereon.

DETAILED DESCRIPTION OF THE PREFERRED EMBODIMENTS

The detailed description of the present invention is presented largely in terms of procedures, steps, logic blocks, processing, or other symbolic representations that directly or indirectly resemble the operations of data processing devices. These descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

The present invention pertains to at least a system, a method, and infrastructure each designed to manage certificates for websites hosted on a plurality of servers operated by a platform provider, to manage data traffic between a browser and an endpoint (e.g., one of the websites or platform servers) and to ensure secured communication therebetween. As used herein, any pronoun references to gender (e.g., he, him, she, her, etc.) are meant to be gender-neutral. Unless otherwise explicitly stated, the use of the pronoun "he", "his" or "him" hereinafter is only for administrative clarity and convenience. Additionally, any use of the singular or to the plural shall also be construed to refer to the plural or to the singular, respectively, as warranted by the context.

One of the benefits, advantages and objects in one embodiment of the present invention is to provide an entity designed, installed, configured or programmed to help manage certificates for at least one platform provider, where the platform provider provides services of hosting a plurality of websites having user defined hostnames or domain names. Given the logical location in communications between a browser and a website the browser is attempting to access, the entity is also referred to as an infrastructure provider or simply a middle entity. Depending on the context, the middle entity may be referred to herein an independent business entity or one or more (traffic) control servers. As a business, the middle entity may or may not provide services similar to the platform providers being serviced.

Figure 1A:
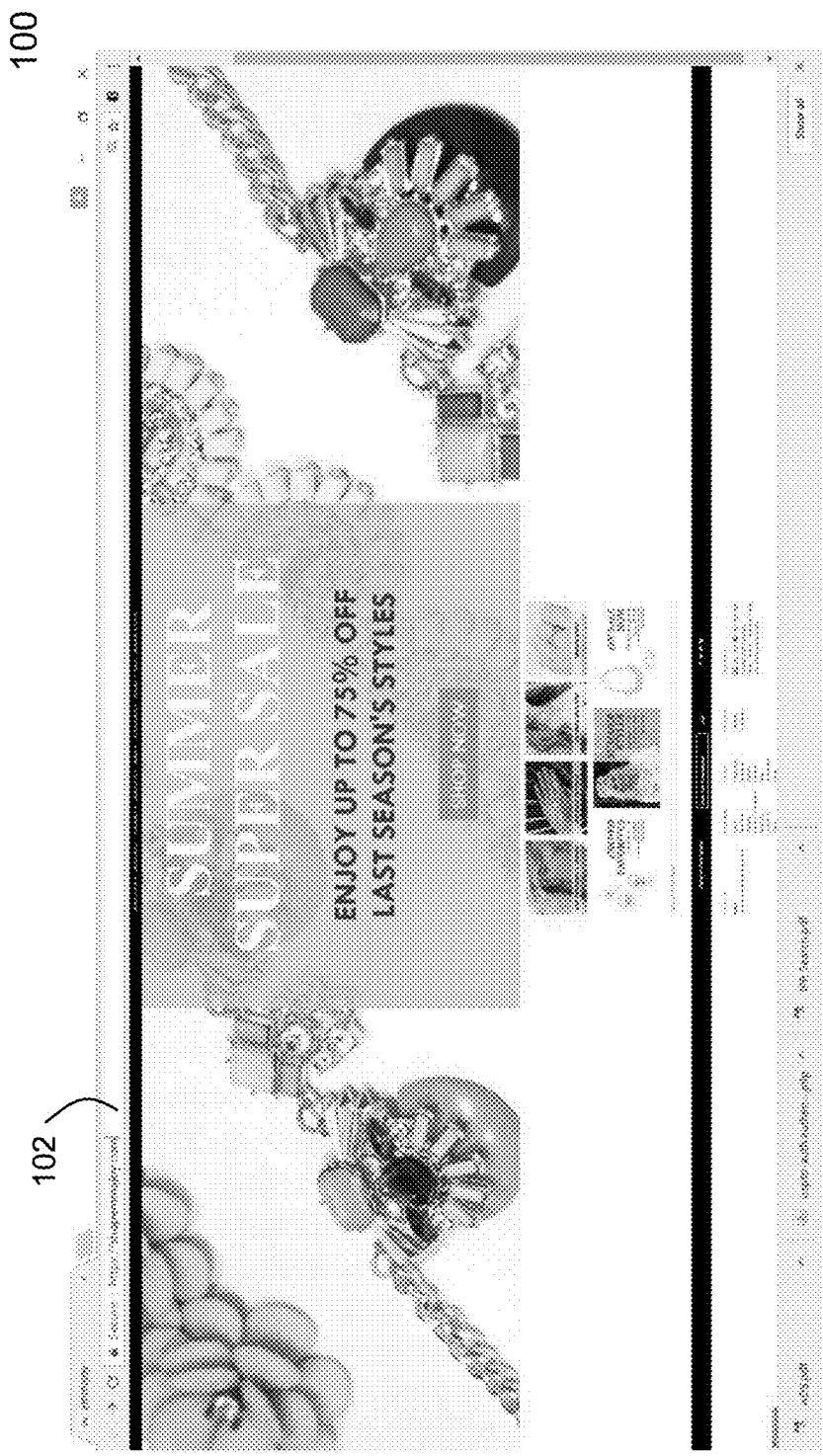
FIG. 1A shows a display of a browser accessing an exemplary website (www.shopemmajoy.com)
Figure 1B:
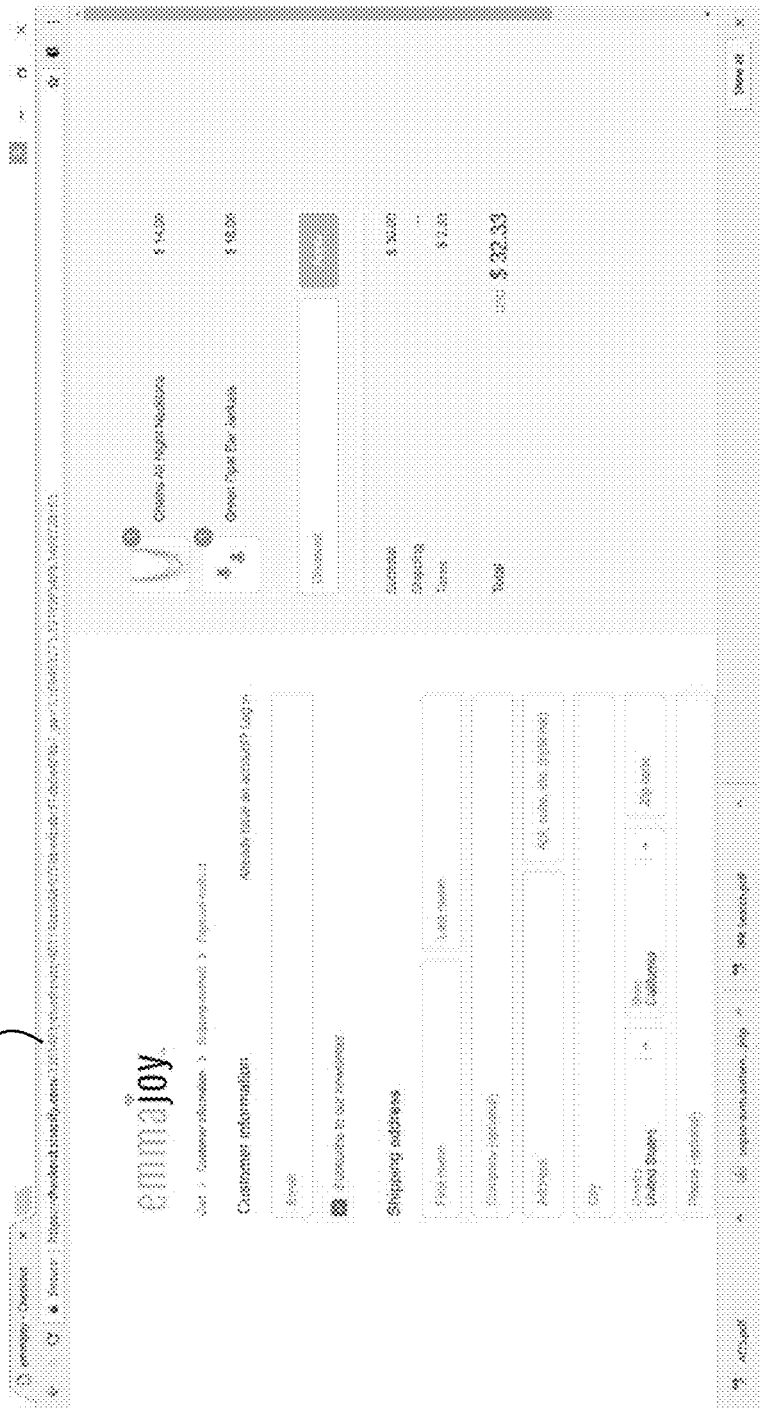
FIG. 1B shows a display of the browser of FIG. 1A accessing another website (https://checkout.shopify.com . . . ) for checking out certain chosen items.
Figure 2A:
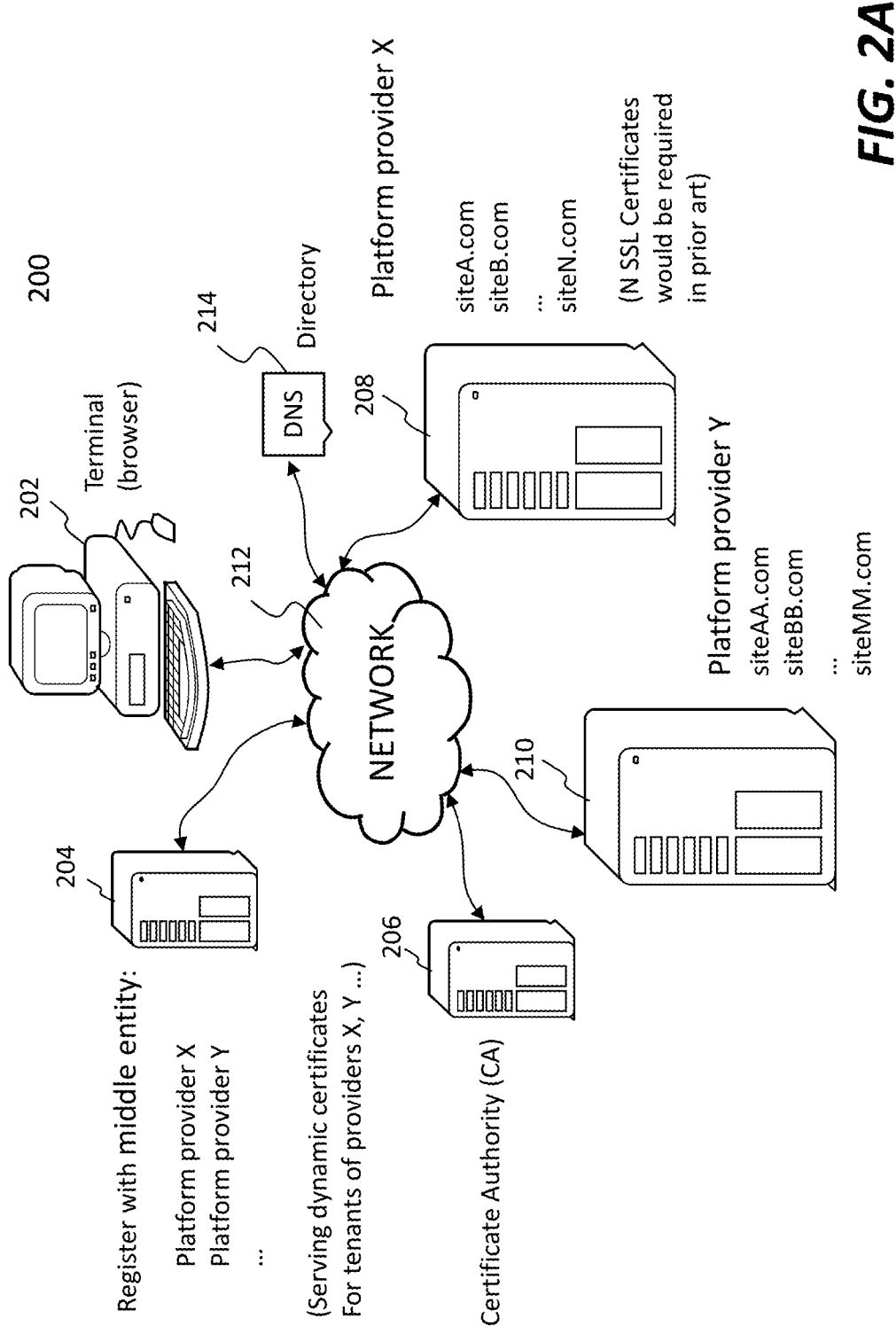
FIG. 2A shows a basic system configuration in which the present invention may be practiced in accordance with one embodiment thereof.

Referring now to the drawings, in which like numerals refer to like parts throughout the several views. FIG. 2A shows a basic system configuration 200 in which the present invention may be practiced in accordance with one embodiment thereof. A user operates a terminal or computing device 202 that may be a laptop, a desktop or a mobile device. The user activates a browser (e.g., Chrome from Google, IE from Microsoft or Safari in iPhone) loaded in the computing device 202 to browse the Internet. In the context of the present invention, it is assumed that the user uses the computing device 202 to access a website siteB.com that is hosted on a platform server 208 operated by a platform provider X. Depending on implementation, the platform server 208 may be allocated for a single business or a plurality of business entities (a.k.a., tenant or tenants of the platform provider X). A tenant may create and maintain a site under a specified hostname (e.g., bob.com or siteB.com). Further, a tenant subscribing to the services offered by the platform provider X may allow its own users to establish their virtual sites with hostnames such as John-Smith.siteB.come and Mary.Doe.siteB.com. The platform server 208 is identified by an IP address corresponding to a domain name, where each of the websites being hosted thereon is identified by a hostname.

As shown in FIG. 2A, the platform provider X hosts or maintains a plurality of sites A, B, . . . N, where each of the N websites has a distinctive hostname designated by a tenant. For better description of the present invention, it is assumed that the N sites are respectively named after siteA.com, siteB.com, . . . , and siteN.com, all are being hosted on the platform server 208. It should be noted that the platform server 208 is a representative of a single server or a cluster of servers, and is addressable by a domain name (e.g., platformX.com) corresponding to an IP address (e.g., 128.38.110.0).

In the prior art, a platform provider has to maintain at least N certificates for these N sites. Should a user or tenant of the platform provider be allowed to have multiple subsites or webpages, each being secured, there could be multiple certificates for the tenant, thus the number of certificates will be increased enormously. The cost and complexity of managing these certificates are operationally expensively. One of the advantages, benefits and objectives in one embodiment of the present invention is to provide external management of these certificates by a middle entity. According to one embodiment, the middle entity, referred herein as ClearAlias, is an independent business entity operating one or more servers 204 (herein control server) provided to manage the certificates for the platform providers, data traffic between an application (e.g., a browser) and an endpoint, and to ensure secured communication therebetween.

As further shown in FIG. 2A, there is another platform provider Y supporting M secured sites for its M users. In practice, M or N is generally in the range of tens of thousands or millions if not billions. In one embodiment, both of the platform providers X and Y enter an agreement with ClearAlias to manage a huge number of certificates for their tenants. As a result, the platform providers X and Y no longer need to store and serve the certificates for their tenants but still ensure secure access to their sites being hosted therewith. As also shown in FIG. 2A and will be further detailed below according to one embodiment, the control server 204 does not need to know or has to be informed any new sites created on a platform server, but can still serve a corresponding certificate when one of the sites being hosted on a platform server is accessed.

Depending on implementation, an application may be a call from another module being executed to access a secured site by a hostname or a web browser for a user to access a designated website with a domain name or hostname. To facilitate the description of the present invention, the application is assumed as a web browser running in the computing device or terminal 202. In operation, the browser in the terminal 202 initiates an access request to access or establish a secure data session with the website with the hostname siteA.com. Instead of going directly to the platform server 208 to access siteA.com, the data flow is directed to the control server 204.

According to one case, the control server 204 checks with a storage or memory device to see if a corresponding certificate is already cached there. Typically, such a certificate could be very well cached if this is not the first time for the control server 204 to receive the traffic to the site siteA.com. When it is the first time for the control server 204 to receive the traffic to the site siteA.com, the control server 204 is designed to generate a certificate for the website. Depending on implementation, the control server 204 may generate such a certificate locally or generate such a certificate in accordance with a certificate authority (CA) 206. This certificate serves the access request from the browser to ensure that the browser is accessing a secured and authenticated website siteA.com. Meanwhile, the server 204 communicates with the server 208 to indicate that the request from the browser is attempting to access the website being hosted thereon. As will be further detailed below, the session is granted after the server 204 acknowledges a certificate received from the server 208 even when there is a mismatch between the hostname and the domain name in the received certificate.

It should be noted that the above operation, as further detailed below, is not simply data exchanges (or gathering or filtering) among four devices 202, 204, 206 and 208. The operation of data traffic detours via the control server 204 significantly improves the management efficiency of certificates in the secured data communication between networked devices over a data network. In one perspective, a platform provider is freed from managing certificates for its ever-growing tenant bases while hosting many secured websites designated respectively with specified hostnames. From another perspective, the infrastructure of the communication between two networked devices is fundamentally different from what it is now. As a result of employing one embodiment of the present invention, the field of secured data communications between two networked devices based on SSL certificates over a data network (e.g., the Internet) is considerably advanced beyond or above what it is now.

Figure 2B:
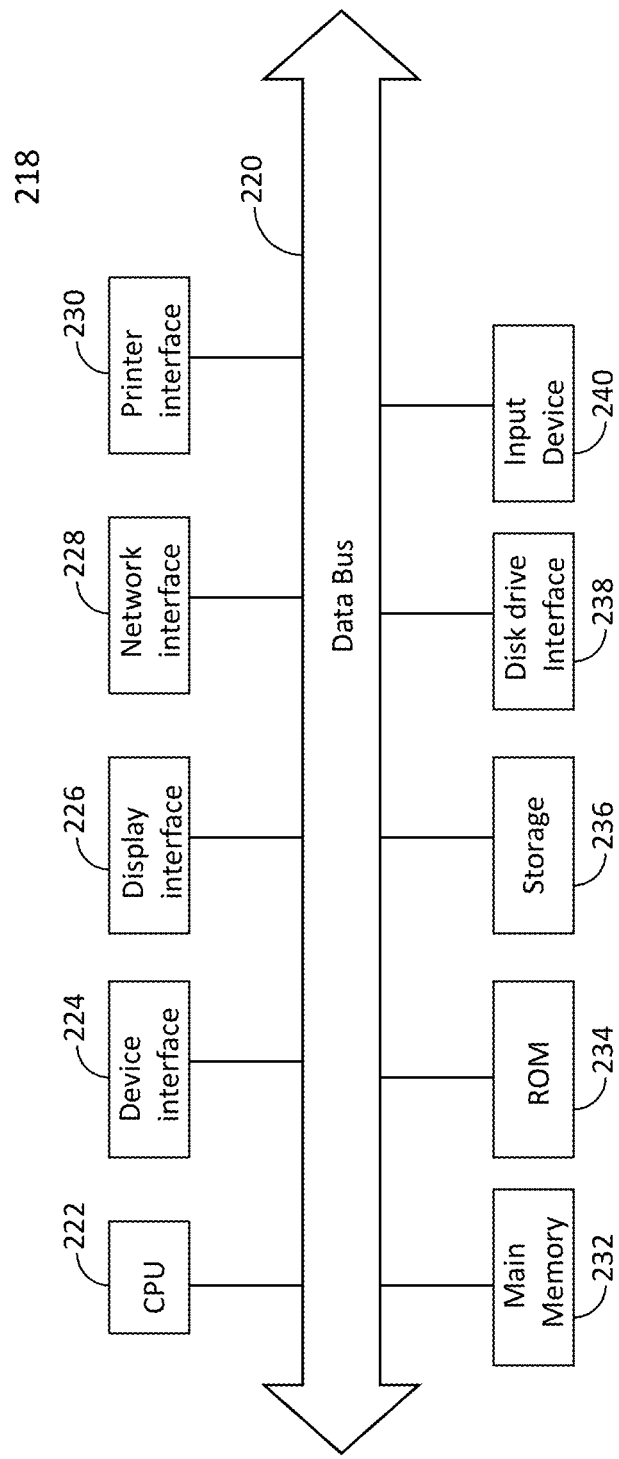
FIG. 2B shows exemplary internal construction blocks of a computing machine in which one embodiment of the present invention may be implemented and executed therein.

FIG. 2B shows exemplary internal construction blocks of a computing machine in which one embodiment of the present invention may be implemented and executed therein. The machine 218 may correspond to one of the devices shown in FIG. 2A and in particular is related to the server 204. As shown in FIG. 2B, the machine 218 includes a central processing unit (CPU) 222 interfaced to a data bus 220 and a device interface 224. The CPU 222 executes certain instructions to manage all devices and interfaces coupled to data bus 220 for synchronized operations. The device interface 224 may be coupled to an external device such as another computing machine hence one or more resources in that computing machine may be utilized. Also interfaced to the data bus 220 is a network interface 228, and a disk drive interface 238. Optionally interfaced to the data bus 220 is a display interface 226, a printer interface 230, and one or more input devices 240, such as touch screen, keyboard, or mouse. Generally, one or more modules (e.g., compiled and linked version or an executable version) implementing one embodiment of the present invention are loaded into the storage 236 through the disk drive interface 238, the network interface 228, the device interface 224 or other interfaces coupled to the data bus 220.

The main memory 232 such as random access memory (RAM) is also interfaced to the data bus 220 to provide the CPU 222 with the instructions and access to memory storage 236 for data and other instructions, applications or services. In particular, when executing stored application program instructions, such as the modules of the present invention (referring to as a server module hereinafter), the CPU 222 is caused to manipulate the data to achieve results contemplated by the present invention. The ROM (read only memory) 234 is provided for storing invariant instruction sequences such as a basic input/output operation system (BIOS) for operation of the display 226 and the input device 240, if there is any. In general, the machine 218 is coupled to a network and configured to provide one or more resources to be shared with or executed by another system on the network or simply as an interface to receive data and instructions from a human being.

FIG. 2B is an example of a computing device that may be used in one embodiment of the present invention. It should be noted that not every component shown in FIG. 2B would have to be in a computing device in order to be used in one embodiment of the present invention. Depending on the configuration of a specific computing device, some or all of the components may be used and sufficient in one embodiment of the present invention.

According to one embodiment, a server module is loaded and executed in a machine (e.g., the server 204 of FIG. 2A) to manage various communications between the terminal 202 and the servers operated by platform providers (e.g., the server 208 or 210), generate one or more certificates in conjunction with the server 206 to serve an access request from the terminal 202, forward the access request to one of the servers 208 and 210, and subsequently ensure a secured communication session between the terminal 202 and one of the servers 208 and 210. In general, an access request (e.g., HTTP request) includes a domain name or a hostname corresponding to a website hosted in one of the servers 208 and 210. As will be appreciated below, there are no inherent limitations in the present invention on serving a domain name or a hostname in an access request. Unless stated explicitly, domain name, hostname, URL and an IP address may be interchangeably used herein to represent a link/address to a website/host/server on the Internet.

From a business perspective, the server 204 is operated by an independent business that has reached a business agreement with the platform provider X and the platform provider Y, where all incoming access requests for a website on the servers operated by the platform provider X or Y will be directed to the server 204 first. The server 204 is charged to serve certificates to these access requests. According to one embodiment, when a tenant signs up with a platform provider X to create his own website designated by a user-defined hostname, such as siteA.com, the IP address or domain name (e.g., ClearAlias.com) of the server 204 is entered in a DNS file 214 (e.g., a zone file). According to another embodiment, a DNS file created for the hostname siteA.com is updated to cause the traffic of an access request to siteA.com directed to ClearAlias.com. As a result, the traffic going to siteA.com will be detoured to ClearAlias.com first.

DNS, standing for Domain Name System, is a hierarchical decentralized naming system for computers, services, or other resources connected to the Internet or a private network. It associates various information with domain names assigned to each of the participating entities. Most prominently, it translates more readily memorized domain names to the numerical IP addresses needed for locating and identifying computer services and devices with the underlying network protocols. The most common types of records stored in a DNS database are for Start of Authority (SOA), IP addresses (A and AAAA), SMTP mail exchangers (MX), name servers (NS), pointers for reverse DNS lookups (PTR), and domain name aliases (CNAME). Although not intended to be a general purpose database, DNS can store records for other types of data for either automatic lookups, such as DNSSEC records, or for human queries such as responsible person (RP) records. The DNS database is traditionally stored in a structured zone file. FIG. 2C shows an example of a structured zone file 250 that directs data traffic going to siteX.com to the server 204 of FIG. 2A with a domain name: ABC.ClearAlias.com, where ABC is an identifier. In one embodiment, an identifier that may take other forms (e.g., F2A3.ABC.ClearAlias.com) servers at least two purposes, one to identify an endpoint and the other to identify which of the servers by ClearAlias to service the request. In the above example, ABC in ABC.ClearAlias.com means the identifier while F2A3 in F2A3.ABC.ClearAlias.com means the identifier and ABC is a corresponding server.

FIG. 2C shows an example of a structured zone file 250 with a CNAME record to direct the access request to the control sever with the domain name ClearAlias.com. In the event there is no CNAME record or CNAME record cannot be updated, the other record (e.g., A record) may be used with an additional note, such as a TXT record for storing the information of the control server. In any event, a directory based on a hostname, such as the DNS file, can be examined by the control server to retrieve what the control server is looking for as the identifier is only known to the control server.

FIG. 2D shows another example of a structured zone file 252 that may be expanded from the structured zone file 250 of FIG. 2C to ensure that an authorized tenant (via the platform provider) has the right to use the services offered by the control server and meanwhile to prevent an unauthorized tenant from getting the services for free, or prevent bad actors from sending encrypted data to the platform provider without consent. According to one embodiment, some tenants of a platform provider may want to have their sites secured while others do not care. Thus the arrangements of these tenants with the platform provider are different. The control of the arrangements is achieved through a verifier in a structured zone file according to one embodiment.

The structured zone file 252 includes another parameter (i.e., besides an identifier) that may be referred to as a verifier. As the name suggests, the verifier may be used to identify which site (or hostname) is authorized to receive the services offered by the control server and which site is not authorized to receive the services. The value is a cryptographic hash using a mutually agreed algorithm composed of an authorized hostname (e.g., siteX.com) and a shared value known only to the middle entity, ClearAlias and the platform provider. The detail of how such a hash function or algorithm works with two inputs or more is not to be further described as those skilled in the art understand how a hash function works.

Depending on implementation, the shared value may be the identifier or a secret value. For example, an authorized hostname is siteX.com and the shared value is F2A3 (which is also the identifier). The pair (siteX.com, F2A3) hashes to G3B4 using a mutually agreed hash algorithm. In this example, the "identifier" is "F2A3" and the "verifier" is "G3B4". The structured zone file 252 of FIG. 2D shows the example of using a link F2A3.G3B4.ABC.ClearAlias.com to not only direct the traffic of an access request to access siteX.com to the control server 204 and an identifier to identify an endpoint but also a verifier to verify that siteX.com is an authorized site to serve a certificate therefor. Should another site siteXX.com try to take advantage of the control server 204, the pair (siteXX.com, F2A3) would not hash to G3B4, thus no certificate will be served to any access request to access siteXX.com.

As described above, the verifier G3B4 can only be computed by ClearAlias and the platform provider. The verifier can be used effectively to control which sites hosted by a contracted platform provider shall be served with necessary certificates and which ones are not. According to one embodiment, the link including the identifier, verifier and domain name of the middle entity shown in FIG. 2D may be automatically generated/composed and added into a DNS file for a hostname when a site of the hostname is newly created or updated.

In the case that CNAME record cannot be used, a TXT record may be used to include the values G3B4 and F2A3 to facilitate the control server 204 to proceed with the verification of the site. The following lists some of other examples that may be used to modify a zone file for a hostname siteX.com.

1. CNAME record is used with no verifier and no designated server:
www IN CNAME F2A3.clearalias.com; where F2A3 is an identifier
2. CNAME record is used with no verifier but a designated server ABC:
www IN CNAME F2A3.ABC.clearalias.com; where F2A3 is an identifier
3. A record is used with no verifier:
@IN A 1.2.3.4; where 1.2.3.4 is ClearAlias's known IP
@IN TXT "clearalias:F2A3"
4. CNAME record is used with a verifier but no designated server:
www IN CNAME F2A3.G3B4.clearalias.com
5. CNAME record is used with a verifier and a designated server ABC:
www IN CNAME F2A3.G3B4.ABC.clearalias.com
6. A Record is used with a verifier:
@IN A 1.2.3.4; where 1.2.3.4 is ClearAlias's known IP
@IN TXT "clearalias:F2A3:G3B4"

Figure 2E:
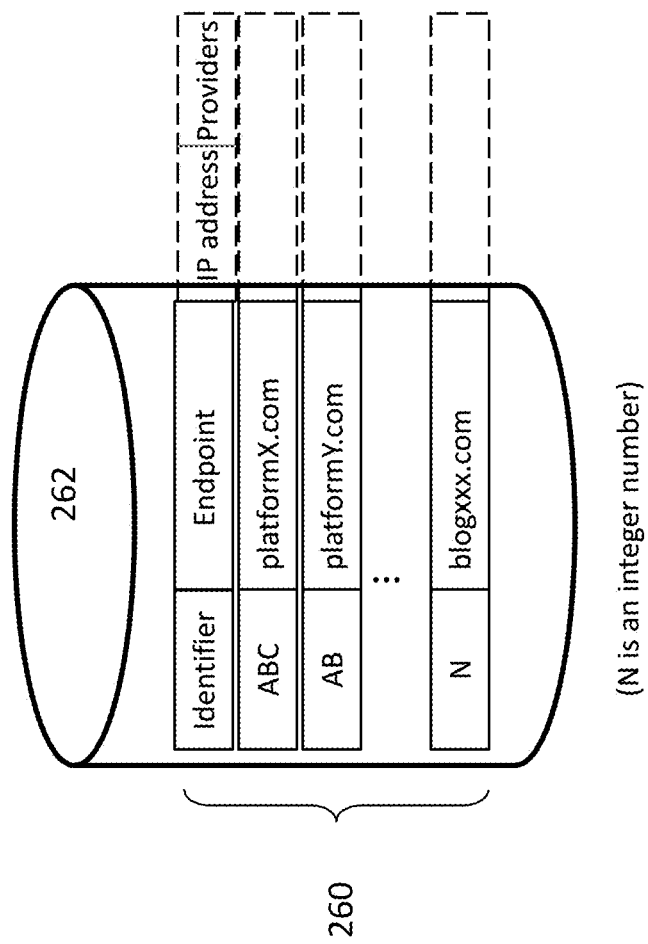
FIG. 2E illustrates an exemplary lookup table in a database that may be in or used by the server 204 of FIG. 2A to obtain an IP address of a server hosting a website being accessed.

It should be noted that the control server is allowed and known to the platform server with the domain name: platformX.com. Upon receiving the traffic towards siteX.com, the server 204 executing the server module is caused to verify that the traffic is from a valid request. According to one embodiment, a verification process is carried with the zone file 250 to look for an identifier, where the identifier is understood only to the server 204. Once the identifier is obtained from the zone file 250, the server 204 is set to look for a corresponding endpoint per the identifier. FIG. 2E illustrates an exemplary lookup table 260 in a database 262 that may be in or used by the server 204 to obtain the endpoint.

The exemplary lookup table 260 includes two columns, one for identifiers and the other for contracted domain names. As an example, the lookup table 260 shows that the middle entity ClearAlias has contracted with N platform providers to provide the management of the certificates for their tenants. Whenever there is directed traffic coming in, the server 204 checks with a zone file to obtain an identifier. Based on the identifier, the endpoint is retrieved from the lookup table 260, provided there is a match for the retrieved identifier. The match means that ClearAlias knows the detoured traffic is meant for one of its customers. If there is no match, the access request is denied. According to another embodiment, the lookup table 260 may also include an IP address for each of the endpoints and/or an alias corresponding to an endpoint. As a result, there is no need for the server 204 to look for a corresponding IP address in a DNS file when attempting to access the platform server.

Figure 2F:
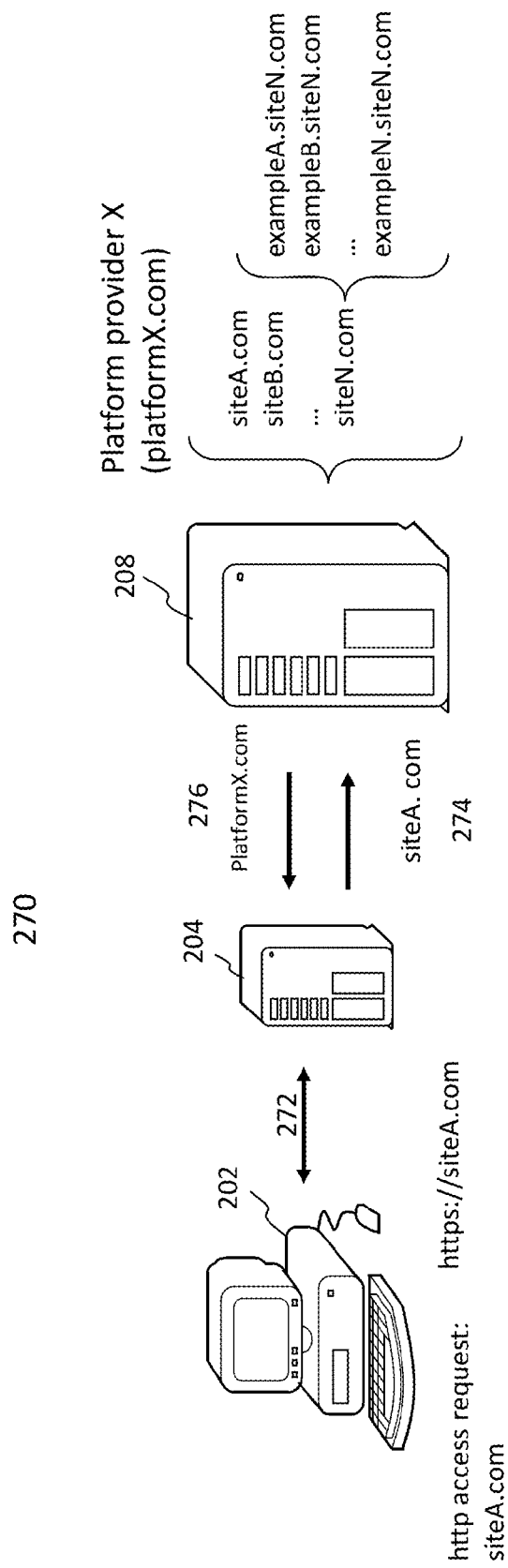
FIG. 2F shows a diagram of a server routing the traffic to an endpoint (i.e., a server designated by an IP address retrieved in FIG. 2C)

It is now assumed that the identifier matches one entry in the lookup table 260. A corresponding endpoint is obtained by the server 204 so that the server knows what to expect from the endpoint. FIG. 2F shows a diagram 270 of the server 204 routing the traffic to the endpoint (i.e., the platform server identified with platformX.com) with the requested hostname siteA.com so that the platform server can serve the proper content based on that hostname.

When the registered endpoint itself is protected by SSL, the name platformX.com in the certificate (stored in the platform server) will not match the name of requested hostname: siteA.com. In this case, according to one embodiment, Clearalias is designed or caused to ignore the certificate mismatch, if and only if the only error is that name of the certificate does not match the requested hostname (siteA.com), but the name (platformX.com) in the certificate matches a known value associated with the registered endpoint.

In one embodiment, the lookup table 260 can be consulted by the control sever 204 when the certificate is received from the platform server 208. A common name in the certificate is looked up according to the lookup table 260. When there is a match, the control server 204 knows platformX.com is one of its customers and thus can ignore the mismatch between the names in the outbound request and the received certificate.

Referring now to FIG. 3A, it shows a flowchart or process 300 of managing and serving certificates for one or more platform or service providers according to one embodiment of the present invention. Depending on implementation, the process 300 may be implemented in software or a combination of software and hardware. The process 300 is initiated when a browser receives a hostname (e.g., johnblog.example.com) at 302, where the browser is running in a terminal (e.g., the terminal 202 of FIG. 2A). The user may enter a hostname johnblog.example.com at the location bar of the browser in the form of http://johnblog.example.com or simply johnblog.example.com.

At 304, the browser initiates an access request including the hostname. The Internet protocol checks with a DNS file per the access request to look up an IP address of a server that hosts a website by the hostname the user is trying to access. A proper term for this process is DNS name resolution that the DNS server resolves the domain name to a corresponding IP address. As described in reference to FIG. 2C, the traffic of the access request is directed to ClearAlias.com. Upon receiving the traffic, the control server operated by ClearAlias.com goes on to check the DNS file to look up an identifier (ID) corresponding to an endpoint the user is trying to access. At 308, the control server determines whether the retrieved ID is known. If it is not known, the process 300 terminates (e.g., implying that ClearAlias is not contracted to serve a platform provider hosting a site named after the hostname). If the ID is known to the control server, the process 300 goes to 310, where it generates a certificate based on a verification process. As described above, if such a certificate was generated before, a copy (not expired and still valid) may be cached locally and can be readily used by the control server to serve the request. It is assumed that the access request is the first ever from a terminal to access the hosted website or the cached certificate is expired and cannot be renewed, which leads to the generation of the certificate per the hostname.

According to one embodiment, per the received traffic, the control server contacts the CA server 206 of FIG. 2A to request an SSL certificate for the hostname. The CA server 206 initiates a verification process to ensure that the control sever is authorized to receive the certificate. As a response to the request from the control server, the CA server 206 sends out a request (e.g., to ask a site named after the hostname to answer one or more credential questions and provide necessary data) to ensure the requestor is who it claims to be. Because of the modified zone file shown in FIG. 2C, the traffic of the request from the CA server 206 is routed back to the control server. As a result, the control server can proceed with the verification with the CA server 206 on behalf of the site with the hostname.

Figure 3B:
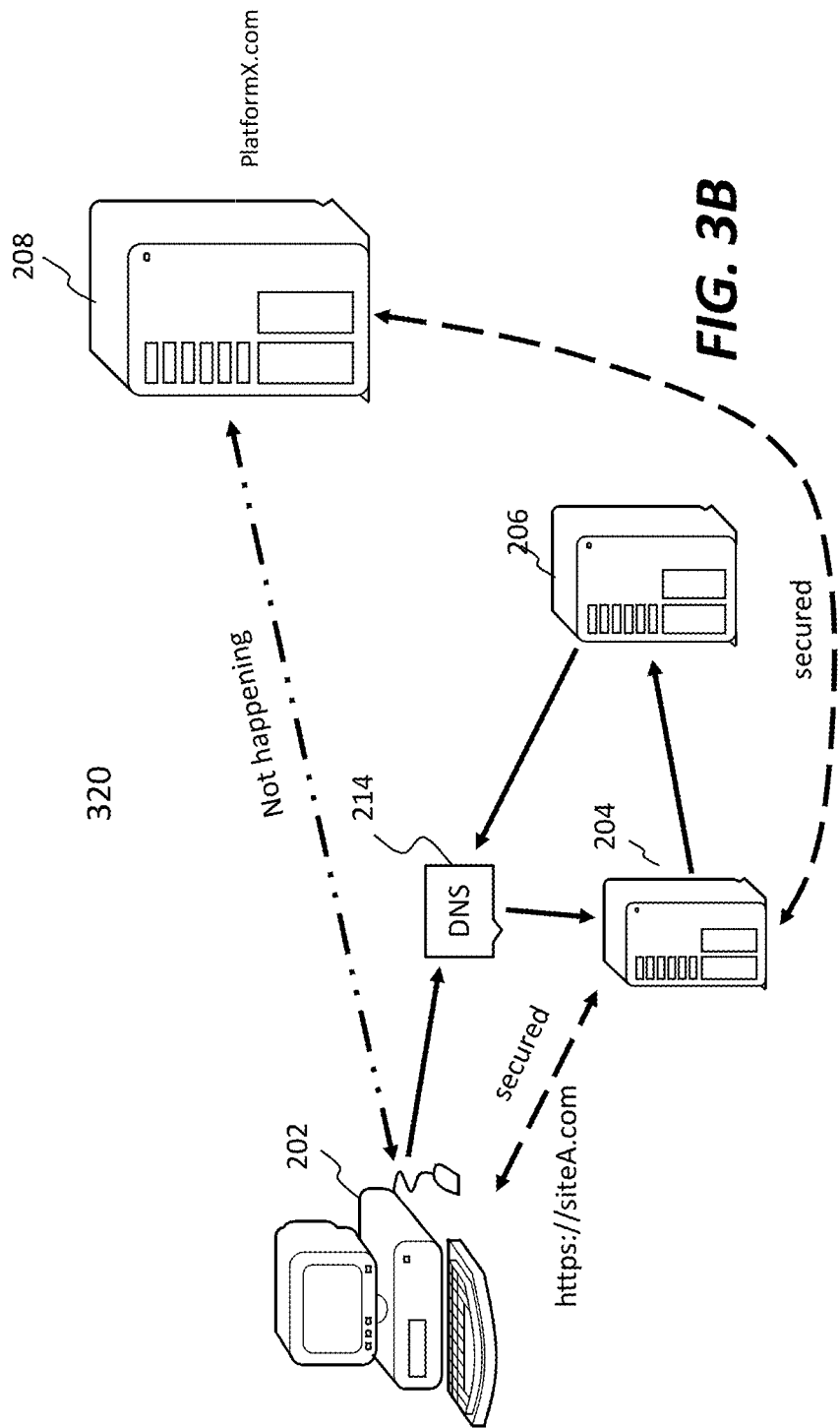
FIG. 3B illustrates a diagram of the traffic detours among the related devices when a certificate has to be generated or regenerated with a CA server.

FIG. 3B illustrates a diagram 320 of the traffic detours among the related devices when a certificate has to be generated or regenerated with the CA server 206. As described above, the initial request from the terminal 202 accessing a website named after a hostname is directed to the control server 204 because of the modified DNS file 214 (see FIG. 2C). Now the control server 204 needs to get the certificate on behalf of the hostname hosted on the endpoint 208 which the initial access request wants to access. As described above, the CA server 206 needs to verify who the control server 204 claims to be. The CA server 206 sends out a request to the site named after the hostname. Again because of the modified DNS file 214, the traffic from the request is returned to the control server 204. Accordingly, the control server 204 can proceed with the request from the CA server 206 to finish whatever is needed by the verification process on behalf of the site being accessed, where it is assumed that the site of the hostname is hosted on the platform 208.

In addition, it should be noted that the server 206 is further designed to automate the certificate lifecycle management. Some of the main functions that are automated as part of the certificate management include: Requesting certificates, Checking order status, Renewing certificates, Revoking certificates and Updating certificates. The details of these functions are not to be further described to avoid obstructing aspects of the present invention. Those skilled in the art shall fully understand what these functions mean and how they can be automatically managed in the control server given the detailed description herein.

Returning now to FIG. 3A, at 312, the certificate dynamically generated is used to serve the access request. As a result, a secure session is established between the control server and the terminal running the browser. At this moment, the browser shows a sign "https://" to indicate that it is accessing a secured website. Meanwhile the control server contacts the platform server (e.g., endpoint) operated by the platform provider, where the platform provider is contracted with ClearAlias to manage certificates for its customers (e.g., the platform providers).

It is assumed that the control server and the endpoint trust each other. A secure session is established at 316. The process 300 now moves to 318 to cause the endpoint to deliver the content to the terminal through the secure session via the control server 204.

Figure 3C:
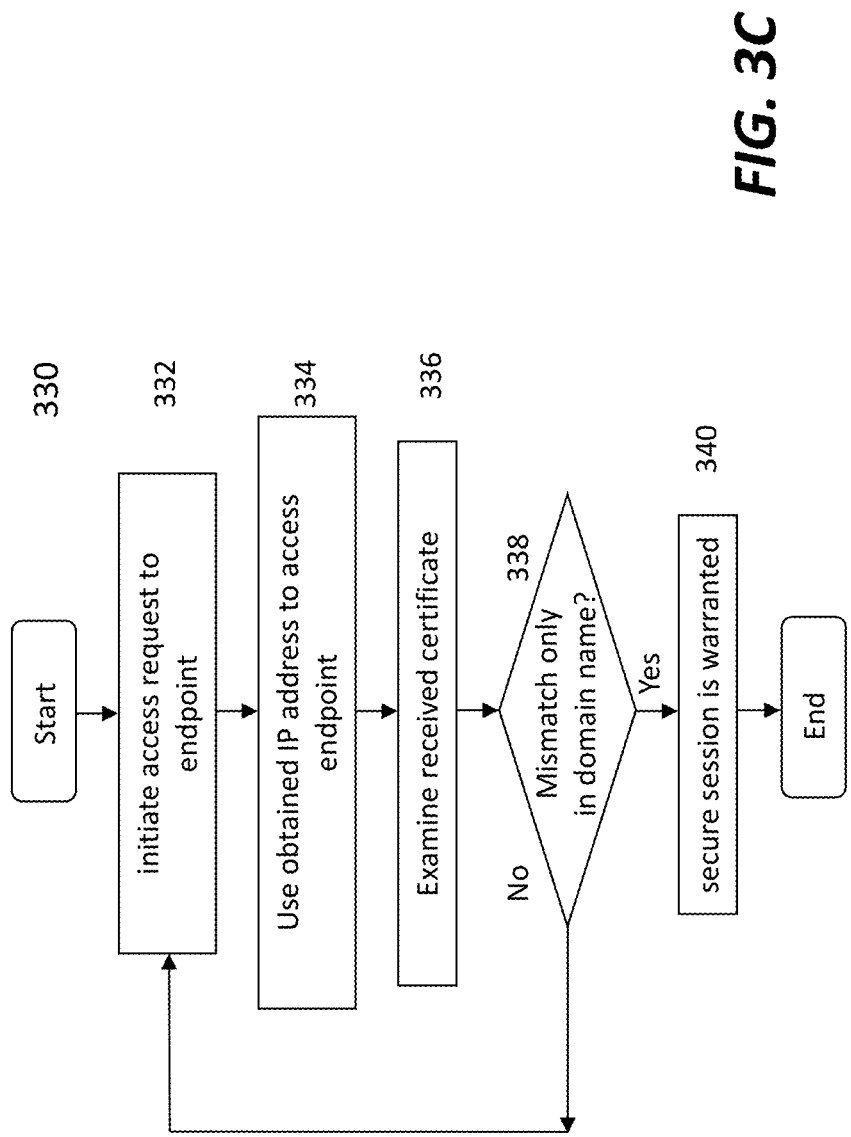
FIG. 3C shows a flowchart or process of establishing a secure session between a control server and a platform server hosting a website being accessed.

Referring now to FIG. 3C, it shows a flowchart or process 330 of establishing a secure session between a control server and an endpoint. With reference to FIG. 3A, the control server corresponds to the server 204 of FIG. 2A and the endpoint corresponds to a platform server (the server 208 or 210 of FIG. 2A), where the platform server hosts a website being accessed. According to one embodiment of the present invention, the process 330 may be used to implement 316 of FIG. 3A. At 332, the control server (e.g., the server 204 of FIG. 2A or FIG. 2F) initiates an access request on behalf of the terminal 202 of FIG. 2A or FIG. 2F, where the access request includes the hostname (e.g., siteA.com).

At 334, the IP address of the endpoint is obtained to access the platform server. The access request initiated by the control server arrives at the endpoint (e.g., the server 208 of FIG. 2A or FIG. 2F). At 336, in responding to the access request, the platform server serves a certificate. Once the certificate is received in the control server, the certificate is examined. As an example shown in FIG. 2F, the certificate shows that it is from a platform server with a domain name platformX.com while the access request has a hostname of siteA.com. Thus there is a mismatch in the names at 338. In the prior art, the platform server would terminate the access request because a different server is being accessed.

According to one embodiment, the mismatch has to happen because the platform sever is no longer in operation to store a corresponding certificate. In other words, certification of siteA.com is now managed at the control server. The mismatch is carefully processed at 338 to ensure it is from a contracted platform provider. Such a certificate mismatch is ignored if and only if an error is that a name in the certificate does not match the requested hostname, but the name or some of the name corresponds to an entry in the lookup table as shown in FIG. 2E. The name in a received certificate is also referred to as a common name that may be a domain name or an owner name. For example, a hostname is siteA.platformX.com while the name (e.g., domain name) in the certificate is platformX.com, in which case the control server accepts the mismatch because of the matched domain name. In another example, a hostname is siteA.com while the domain name in the certificate is platformX.com, in which case the control server accepts the mismatch, provided that the control server expects such a mismatch based on the lookup table as shown in FIG. 2E. In yet another example, a hostname is siteA.com while a common name in the certificate is Allplatform Corporation (owner name) in which case the control server accepts the mismatch, provided that the control server expects such a mismatch based on the lookup table as shown in FIG. 2E.

It is assumed that the mismatch is expected or within an excepted range. The process 330 goes to 340 to establish a secured session between the control sever and the platform server. Once the session is establish, content as requested in the original access request from the browser is delivered to the terminal via the control server.

Referring now to FIG. 4A, there is shown a functional block diagram of a server device 400 in which a server module 402 resides in a memory space 403 and is executable by one or more processors 401. Depending on implementation, this server may be a single server or a cluster of two or more servers. One embodiment of the present invention is implemented as cloud computing in which there are multiple computers or servers deployed to serve as many businesses (websites) as practically possible. For illustration purpose, a representative of a single server device 400 is shown and may correspond to the server 204 in FIG. 2A. The server device 400 includes a network interface 404 to facilitate the communication between the server device 400 and other devices on a network and a storage space 405. The server module 402 is an executable version of one embodiment of the present invention and delivers, when executed, some or all of the features/results contemplated in the present invention.

According to one embodiment, the server module 402 comprises an administration interface 406, an account manager 408, a security manager 412, a record manager 414, a certificate manager 416, and a data processing module 418.

Administration Interface 406:

As the name suggests, the administration interface 406 facilitates a system administrator to register a business entity subscribing to full customer operations provided by the server 400 and grant respective access privileges to the authorized operators of the business entity. The administration interface 406 is an entry point to the server module from which all sub-modules or parameters thereof can be initiated, updated and managed. For example, a business operating a platform subscribes to the services offered by a middle entity or the server 400 and authorizes the server 400 to generate, on its behalf, certificates for its tenants. In operation, the platform provider shares with the middle entity operating the server 400 a list of hostnames designated respectively by its users. Depending on a level of services being subscribed by the platform provider, the administration interface 406 may be used to determine how to manage an account for the platform provider, set up a charge schedule for the account and other account related matters.

Account Manager 408:

In accordance with the administration interface 406, the account manager 408 is provided to keep a list of accounts subscribing the services being offered by the server 400. It is assumed that there are a plurality of platform providers, some providing content while others proving transactions. The account manager 408 allows the middle entity to manage all of its accounts.

Security Manage 412

This module is configured to provide security to all data in the server 400 and manage secured communications with subscribers. The stored data for each of the subscribing businesses or companies may be encrypted thus only authorized user may access the secured data. In some situations, an encryption key to a secured file is securely maintained and may be retrieved by a system administrator to access a secured document in case there is a need. In one embodiment, the security manager 412 is configured to initiate a secure communication session with a platform provider to get updated hostnames whenever a new user signs up with the platform or creates a hostname.

Record Manager 414

The record manager 414 may be provided to record the status of handling each access requests. Depending on implementation, different status may be recorded and reported to a platform provider if needed. According to one embodiment, the status of mismatch between a requested hostname and a name in a received certificate may be recorded to ensure any subsequent mismatch will be handled accurately.

Certificate Manager 416:

This module is primarily used to cache newly generated certificates. As described above, a certificate is generated per a hostname in an access request received from a browser. In one embodiment, once the certificate is generated, a copy is cached in the certificate manager 416. Should the same user access the website by the same hostname again, there is no need to regenerate the certificate. The cached certificate may be readily used.

Data Processing 418:

As the name suggests, this module is configured to perform all types of data processing related to the services being provided to the subscribers. In operation, for example, an access request to a platform server is composed and initiated by the data processing 418, where the access request is initiated in the server 400 based on the hostname in a received access request initiated in a browser. In another example, a hash computation is carried out to verify that an verifier extracted from a zone file is indeed an output of the computation with at least two inputs, hostname and a parameter (e.g., an identifier).

The invention is preferably implemented in software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

I claim:

1. A method for managing a secure session between a terminal and a platform server, the method comprising:
receiving in a control server data traffic of a first access request initiated from an application running in the terminal, the first access request including a hostname of a virtual site, wherein the data traffic is directed to the control server per a directory on a network, and the virtual site is hosted on the platform server operated by a platform provider;
determining an identifier in the directory, wherein the identifier is specifically used to guide the control server;
looking up for the platform server corresponding to the identifier;
initiating by the control server to generate a first certificate based on the hostname when the first certificate is not cached locally in the control server;
following a verification process via the directory to confirm that the generated first certificate is authorized by the platform provider operating the virtual site with the hostname but received by the control server; and
serving the newly generated first certificate to the first access request to establish a secure session between the terminal and the control server;
serving the first certificate of the virtual site to the first access request to establish a secure session between the terminal and the control server.

2. The method as recited in claim 1, further comprising:
initiating a second access request in the control server, wherein the second access request includes the hostname;
receiving a second certificate from the platform server;
extracting a common name related to the platform server from the second certificate; and
ignoring a mismatch between the hostname and the common name to establish a secure session between the control server and the platform server.

3. The method as recited in claim 2, wherein the platform server does not maintain the first certificate to serve the first access request but delivers secure content to the application running in the terminal.

4. The method as recited in claim 3, wherein the application is a web browser and the virtual site is a website with the hostname designated by a tenant subscribing to services offered by the platform provider, the hostname is entered by a user to the web browser initiating the first access request.

5. The method as recited in claim 4, wherein said verification process comprises:
controlling a data flow by the directory to confirm with a Certificate Authority (CA) that the control server is eligible for receiving the first certificate, wherein the data flow destined to the platform server is authorized to route to the control server.

6. The method as recited in claim 1, wherein the directory is a DNS file, the identifier is included in a shared value embedded in a predefined area in the DNS file, the shared value itself is specifically used to guide the control server.

7. The method as recited in claim 6, wherein said looking up for the platform server corresponding to the identifier comprises:
obtaining in the control server a copy of the DNS file;
examining the copy of the DNS file to extract the identifier known to the control server; and
verifying the identifier with a database including at least a table having corresponding entries of identifiers versus platform servers of a list of platform providers being serviced by the control server.

8. The method as recited in claim 7, wherein each of the platform servers hosts a plurality of websites, maintains no corresponding certificates for the hosted websites, but delivers secured contents to a browser accessing one of the hosted websites.

9. The method as recited in claim 8, wherein the control server is independently operated by a middle entity in business of managing certificates of a plurality of virtual sites hosted on the platform servers.

10. The method as recited in claim 9, wherein the control server executes a server module configured to generate any of the certificates dynamically on behalf of one of the virtual sites being requested for access.

11. A control server for managing a secure session between a terminal and an endpoint, the control server comprising:
   a network interface to couple the control server to a data network;
   an interface to a storage device including a database, wherein the database includes at least a relationship between an identifier and the endpoint;
   a processor;
   a memory space, coupled to the processor, for storing code, wherein the code is executed by the processor to perform operations of:
      receiving data traffic of a first access request initiated from an application running in the terminal, the first access request including a hostname of a virtual site, wherein the data traffic is directed to the control server per a director on the data network, and the virtual site is hosted on the endpoint operated by a platform provider;
      determining the identifier in the directory, wherein the identifier is specifically used to guide the control server;
      looking up for the endpoint corresponding to the identifier; and
      serving a first certificate of the virtual site to the first request access to establish a secure session with the terminal, when the first certificate is cached locally; or
      generating a first certificate based on the hostname, when the first certificate is not cached locally;
         following a verification process via the directory to confirm that the generated first certificate is authorized by the platform provider operating the virtual site with the hostname but received by the control server; and
         serving the newly generated first certificate to the first access request to establish a secure session with the terminal.

12. The control server as recited in claim 11, wherein the operations further comprise:
   initiating a second access request including the hostname;
   receiving a second certificate of the endpoint;
   extracting a common name from the second certificate; and
   ignoring a mismatch between the hostname and the common name to establish a secure session between the control server and the endpoint.

13. The control server as recited in claim 12, wherein the endpoint does not maintain the first certificate to serve the first access request but delivers secure content to the application running in the terminal.

14. The control server as recited in claim 13, wherein the application is a web browser and the virtual site is a website with the hostname designated by a tenant subscribing to services offered by the platform provider, the hostname is entered by a user to the browser initiating the first access request.

15. The control server as recited in claim 14, wherein the verification process comprises:
   controlling a data flow by the directory to confirm with a Certificate Authority (CA) for receiving the first certificate, wherein the data flow destined to the endpoint is authorized to route to the control server.

16. The control server as recited in claim 11, wherein the directory is a DNS file, the identifier is included in a shared value embedded in a predefined area in the DNS file, the shared value itself is specifically used to guide the control server.

17. The control server as recited in claim 16, wherein said operation of looking up for the endpoint corresponding to the identifier further comprises:
   obtaining in the control server a copy of the DNS file;
   examining the copy of the DNS file to extract the identifier known to the control server; and
   verifying the identifier with a database including at least a table having corresponding entries of identifiers versus endpoints corresponding to a list of platform providers being serviced by the control server.

18. The control server as recited in claim 17, wherein each of the endpoints hosts a plurality of sites, maintains no corresponding certificates for the hosted sites, but delivers secured contents to a browser accessing one of the hosted websites.

19. The control server as recited in claim 18, wherein the control server is independently operated by a middle entity in business of managing certificates of the hosted sites for the platform providers.

* * * * *